(12) United States Patent
Fink

(10) Patent No.: US 12,065,237 B2
(45) Date of Patent: Aug. 20, 2024

(54) FLIGHT DURATION ENHANCEMENT FOR SINGLE ROTORCRAFT AND MULTICOPTERS

(71) Applicant: Arizona Board of Regents on Behalf of the University of Arizona, Tucson, AZ (US)

(72) Inventor: Wolfgang Fink, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 17/967,759

(22) Filed: Oct. 17, 2022

(65) Prior Publication Data

US 2023/0122833 A1   Apr. 20, 2023

Related U.S. Application Data

(60) Provisional application No. 63/256,080, filed on Oct. 15, 2021.

(51) Int. Cl.
| | |
|---|---|
| *B64C 27/467* | (2006.01) |
| *B64C 27/06* | (2006.01) |
| *B64C 27/08* | (2023.01) |
| *B64C 27/32* | (2006.01) |

(52) U.S. Cl.
CPC ............ *B64C 27/467* (2013.01); *B64C 27/06* (2013.01); *B64C 27/08* (2013.01); *B64C 27/325* (2013.01)

(58) Field of Classification Search
CPC ....... B64C 27/467; B64C 27/06; B64C 27/08; B64C 27/325
See application file for complete search history.

(56) References Cited

U.S. PATENT DOCUMENTS

| | | | |
|---|---|---|---|
| 2018/0208295 A1* | 7/2018 | Mores | B64C 11/001 |
| 2018/0297697 A1* | 10/2018 | Tunekawa | B64C 39/024 |
| 2019/0144107 A1* | 5/2019 | Rudraswamy | B64C 27/28 244/7 A |

(Continued)

OTHER PUBLICATIONS

Bassi, et al., "Optimal attitude control parameters via stochastic optimization framework for autonomous aircraft", IEEEAC paper #1753, Dec. 4, 2008.

(Continued)

*Primary Examiner* — Michael L Sehn
(74) *Attorney, Agent, or Firm* — Thomas | Horstemeyer, LLP

(57) ABSTRACT

Various examples are provided related to flight duration enhancement for rotorcraft and multicopters. In one example, a rotorcraft or multicopter includes one or more rotors, and one or more nozzles positioned in relationship to at least one corresponding rotor. The one or more nozzles can modulate, reshape, redirect, or adjust downwash produced by the corresponding rotor. The one or more nozzles can dynamically modulate, reshape, redirect, or adjust the downwash below the rotorcraft or multicopter. The one or more nozzles can be morphed or reshaped to dynamically modulate, reshape, redirect, or adjust the downwash using, e.g., a stochastic optimization framework and/or a motif-based auto-controller.

18 Claims, 11 Drawing Sheets

(56) References Cited

U.S. PATENT DOCUMENTS

2019/0144116 A1* 5/2019 Yuan .................. B64C 27/08
                                                    701/3
2020/0339256 A1* 10/2020 Ivans ................. B64D 5/00
2022/0111952 A1* 4/2022 Truong ............... B64C 27/10

OTHER PUBLICATIONS

Wolfgang Fink, "Stochastic optimization framework (SOF) for computer-optimized design, engineering, and performance of multi-dimensional systems and processes", Proc. SPIE 6960, Space Exploration Technologies, 69600N (Apr. 15, 2008); doi: 10.1117/12.784440.

* cited by examiner

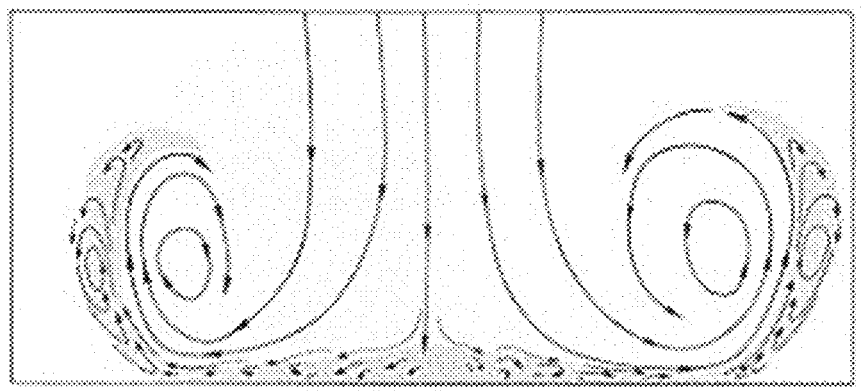
FIG. 1A
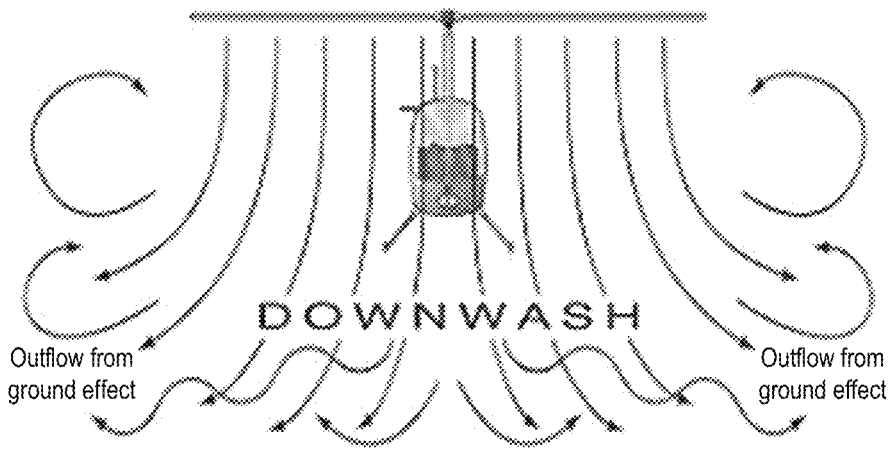
FIG. 1B
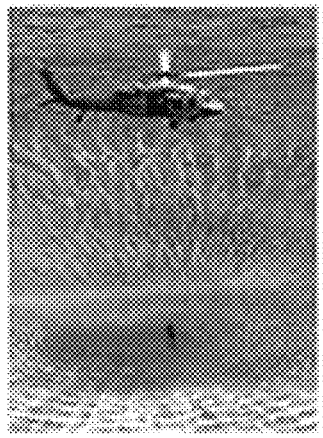 
FIG. 1C   FIG. 1D

FLIGHT DURATION ENHANCEMENT FOR SINGLE ROTORCRAFT AND MULTICOPTERS

CROSS REFERENCE TO RELATED APPLICATIONS

This application claims priority to, and the benefit of, co-pending U.S. provisional application entitled "Flight Duration Enhancement for Single Rotorcraft and Multicopters" having Ser. No. 63/256,080, filed Oct. 15, 2021, which is hereby incorporated by reference in its entirety.

BACKGROUND

Rotorcraft and especially multicopters (often called "drones" or "UAVs," i.e., unmanned aerial vehicles) have become increasingly more popular. Uses range from aerial videophotography, reconnaissance, surveillance, exploration, prospecting, to payload delivery (e.g., military payloads, medical payloads, etc.), etc. Multicopters are being considered for air-taxis for transporting people. One challenge for these vehicles is the relatively short flight time compared to the aerial vehicle mass. Adding more batteries is prohibitive due to the already limited payload.

SUMMARY

Aspects of the present disclosure are related to flight duration enhancement for rotorcraft and multicopters. In one aspect, among others, a rotorcraft or multicopter, comprising: one or more rotors; and one or more nozzles positioned in relationship to at least one corresponding rotor of the one or more rotors, the one or more nozzles configured to modulate, reshape or redirect downwash produced by the at least one corresponding rotor.

In one or more aspects of these embodiments, the one or more nozzles can be configured to concentrate the downwash. The one or more nozzles can direct the concentrated downwash below the rotorcraft or multicopter to enhance lift. The one or more nozzles can be curved to redirect the concentrated downwash. The one or more nozzles can redirect the concentrated downwash to enhance lateral motion of the rotorcraft or multicopter. The one or more nozzles can adjust concentration of the downwash thereby adjusting lift. In some aspects, the rotorcraft or multicopter can comprise a plurality of rotors, wherein the one or more nozzles can include a combined nozzle configured to modulate or reshape downwash produced by at least two rotors. The combined nozzle can be configured to concentrate the downwash from the at least two rotors.

In various aspects, the one or more nozzles can be configured to dynamically modulate or reshape the downwash below the rotorcraft or multicopter. The one or more nozzles can adjust concentration of the downwash thereby adjusting lift. The one or more nozzles can be morphed or reshaped to dynamically modulate or reshape the downwash. The one or more nozzles can be morphed or reshaped by effectuating a conformational change in the one or more nozzles. The conformational change can be effectuated by a stochastic optimization framework and/or by a motif-based auto-controller. The one or more nozzles can redirect the downwash thereby compensating for lateral movement. The one or more nozzles can adjust the downwash when approaching a surface thereby compensating for ground effects. The one or more nozzles can be configured as landing skids thereby providing support of the rotorcraft or multicopter.

In some aspects, the one or more nozzles can be configured as protective covers thereby providing protection to ground personnel when accessing or working near a rotorcraft or multicopter. The one or more nozzles can be configured as protective covers thereby reducing noise generated by one or more rotors of the rotorcraft or multicopter. The one or more nozzles can be configured as protective covers thereby protecting the rotorcraft or multicopter from ambient dust and/or sand stirred up by near ground operation or obstacles during flight.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A-1D and 2A-2B illustrate examples of downwash produced by rotorcraft or multicopters, in accordance with various embodiments of the present disclosure.

DETAILED DESCRIPTION

Figure 2A:

Disclosed herein are various examples related to flight duration enhancement for rotorcraft and multicopters. Reference will now be made in detail to the description of the embodiments as illustrated in the drawings, wherein like reference numbers indicate like parts throughout the several views.

Any kind of rotorcraft generates a downwash beneath the rotor disc (or, alternatively speaking, a suction above the rotor disc), which is in part responsible for the lift of the rotorcraft (e.g., helicopters) and multicopters (e.g., drones or UAVs), especially during in-ground effect. FIGS. 1A and 1B illustrate examples of the downwash of a rotorcraft, including turbulence along the surface below the rotorcraft and along the edges of the downwash. While the downwash is a natural result and provides the lift for the rotorcraft, it also has downsides such as, for example, impacting or even turning over objects on the ground as shown in the image of FIG. 1C, or stirring up dust or sand as shown in the image of FIG. 1D. It can also affect rotorcraft operation to the point of aircraft destruction, especially when operating near the ground, i.e., in in-ground effect situations.

Figure 2B:
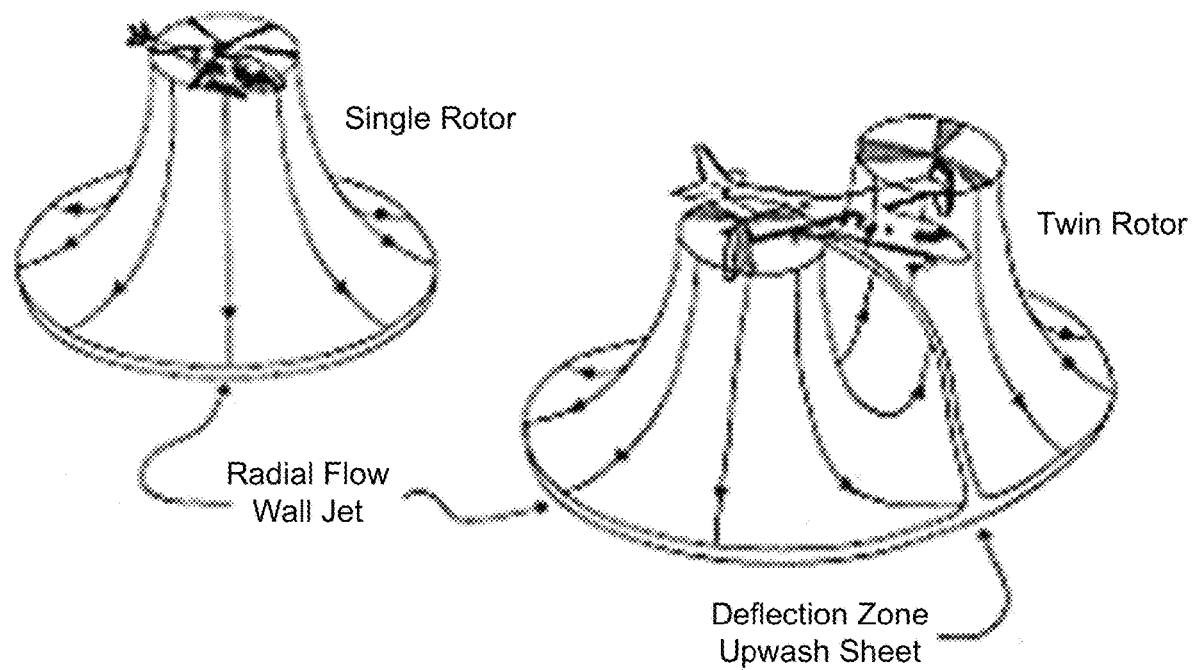
Figure 3:
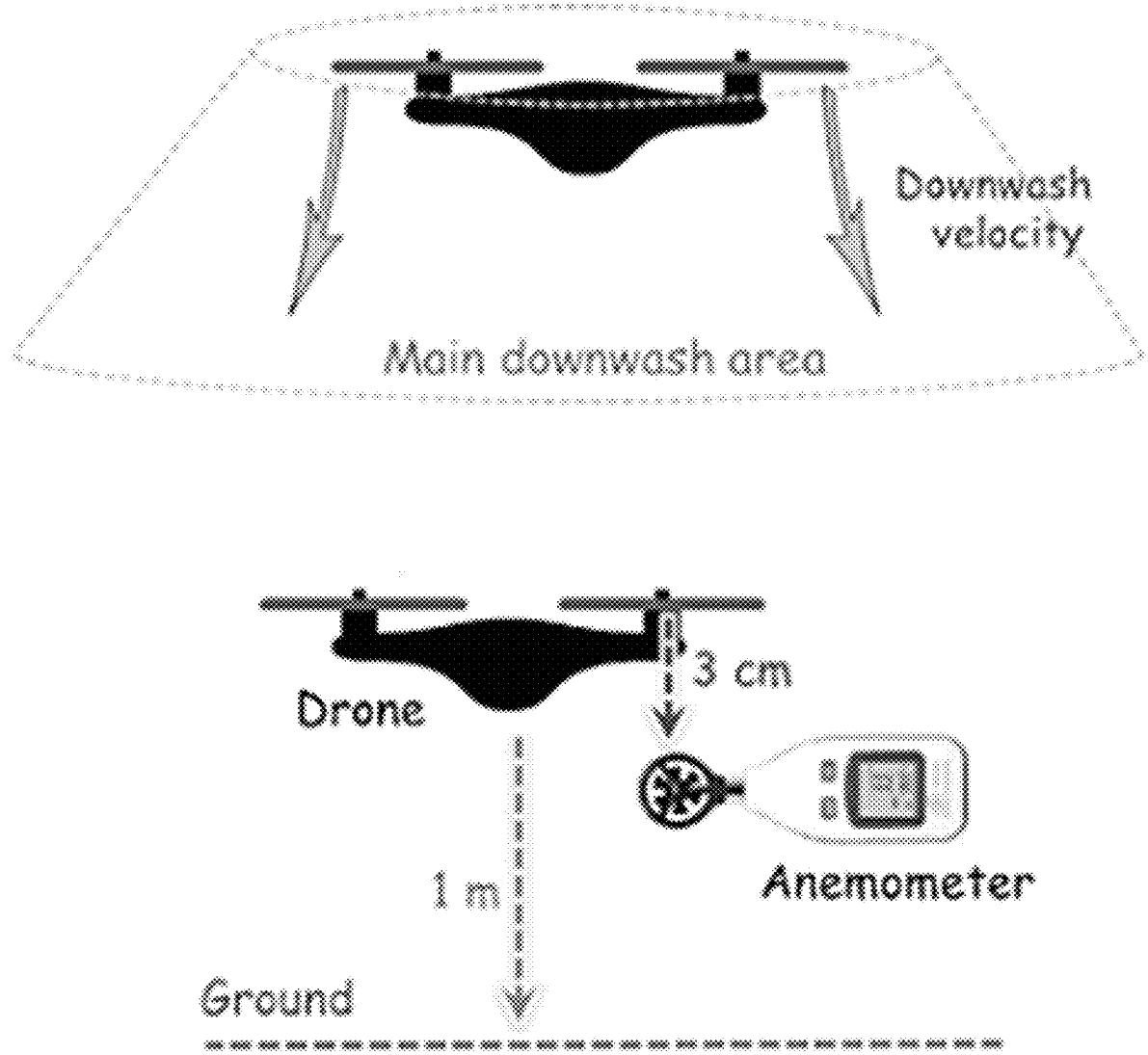
FIG. 3 illustrates an example of downwash area and velocity measurement, in accordance with various embodiments of the present disclosure.
Figure 4:
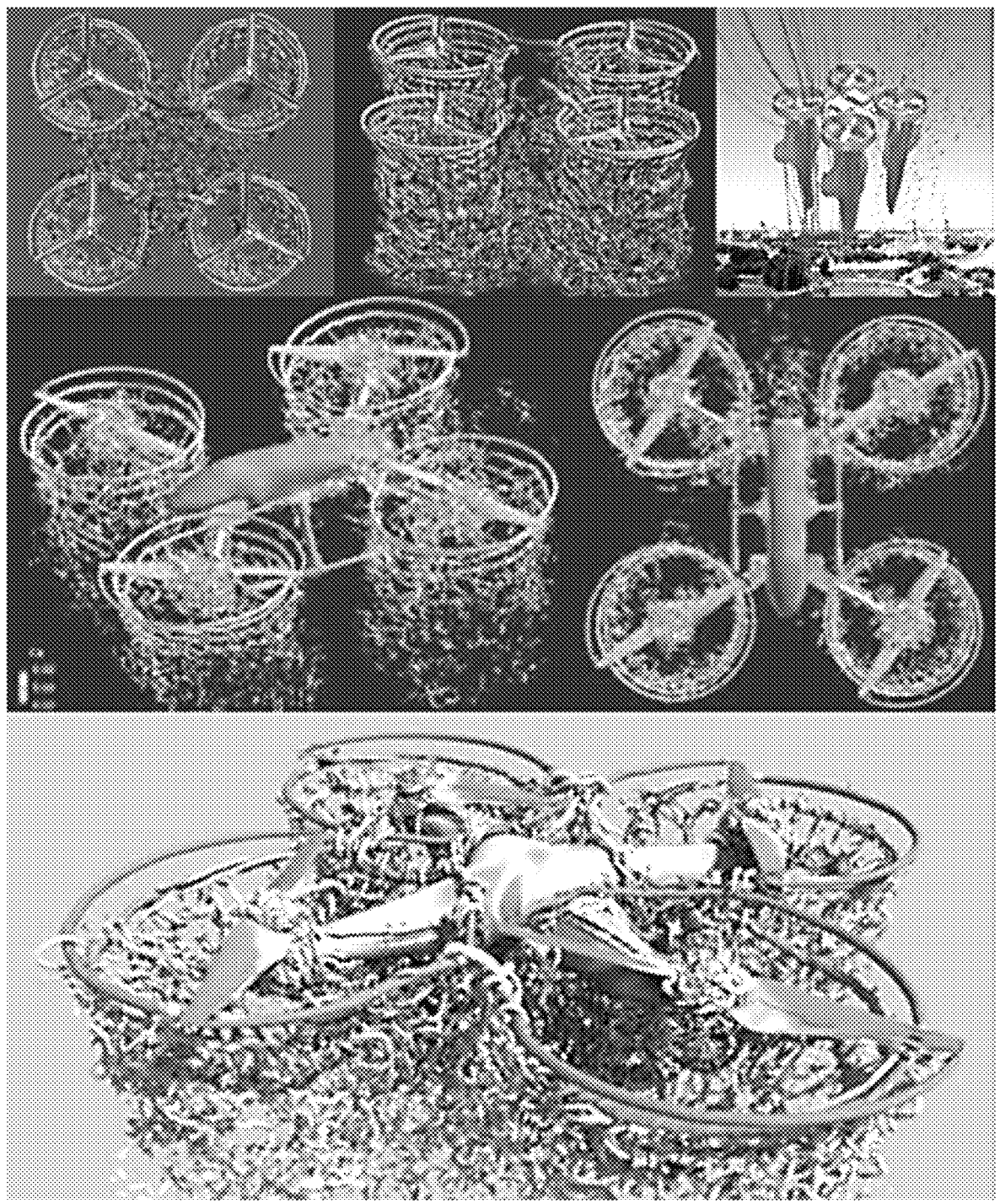
FIG. 4 illustrates examples of downwash simulations for multicopters, in accordance with various embodiments of the present disclosure.

Multicopters, such as the dual-rotor vertical lift aircraft shown in FIG. 2A, also generate downwash. FIG. 2B compares twin rotor downwash to single rotor downwash. The air velocity within the downwash of rotorcraft or multicopters can be assessed with, for example, an anemometer. FIG. 3 illustrates the main downwash area below a quadcopter and an example showing the anemometer positioned to measure downwash velocity. The expected spatial dynamics of the downwash can be visualized in aerodynamic or hydrodynamic simulations, such as shown in FIG. 4 and validated with high-speed video recordings of the actual downwash, which can be visualized, for example, with artificial fog or particulate clouds.

Figure 5A:
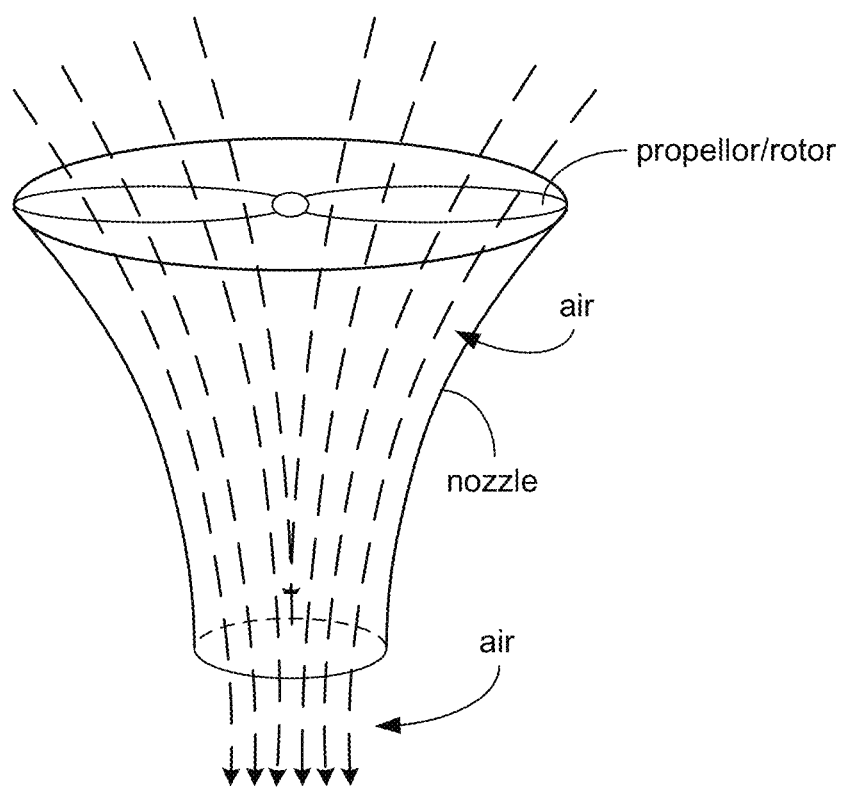
FIGS. 5A-5C illustrate examples of nozzle designs, in accordance with various embodiments of the present disclosure.
Figure 5B:
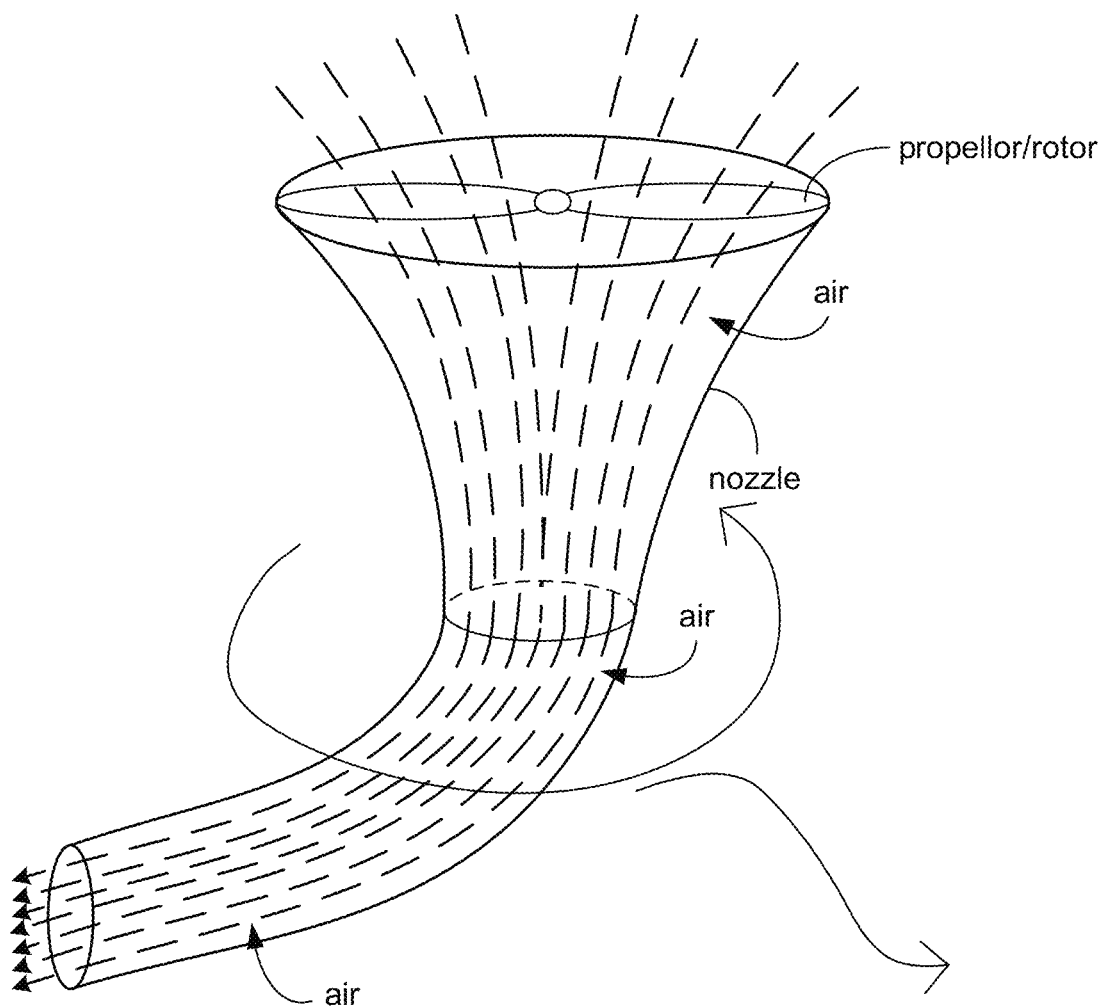
Figure 5C:
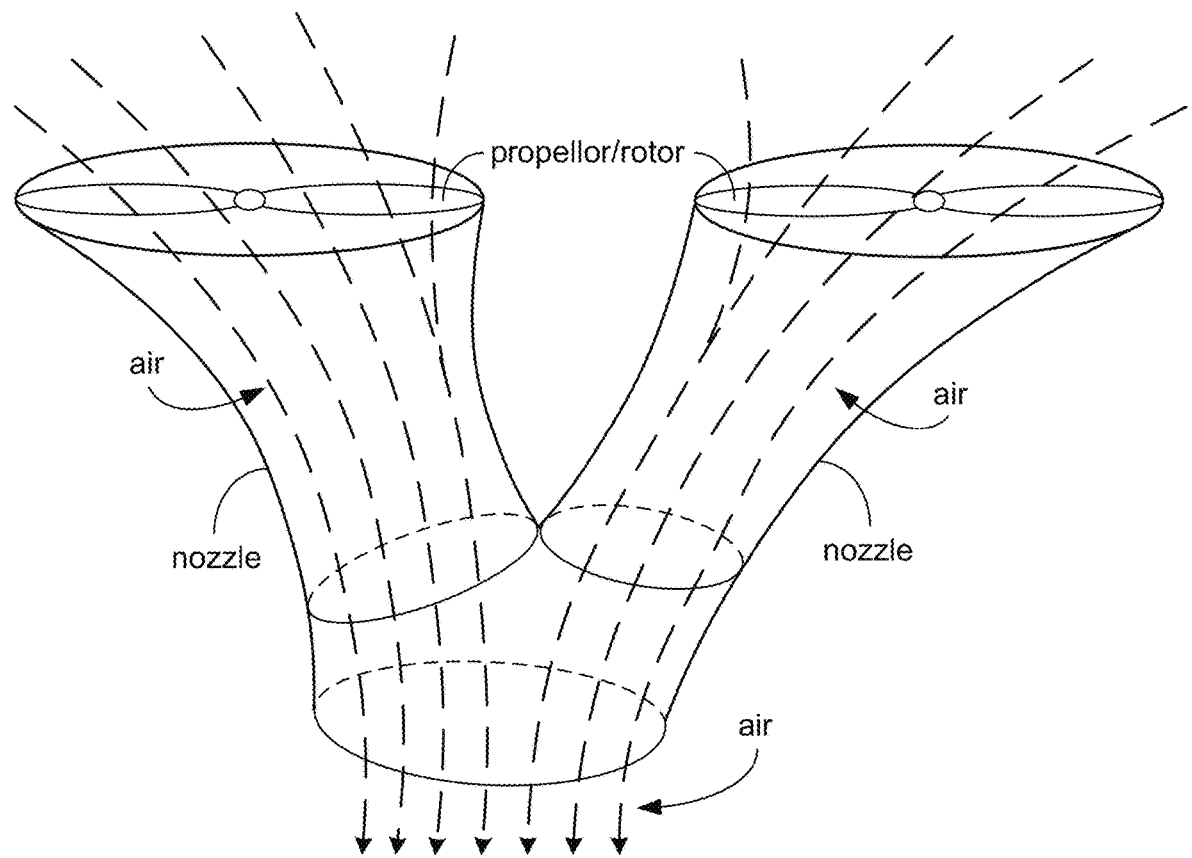

Shrouds or nozzles can be utilized to reshape, redirect, and/or modulate the downwash and downwash characteristics of rotorcraft and/or multicopters to prolong the flight time, to protect the vehicle from ambient dust and/or sand stirred up by near ground operation (i.e., in-ground effect situations), to protect rotors from contact with obstacles (e.g., walls, houses, trees, landscape, mountains, etc.) during flight, to protect ground personnel when accessing or working near an operating vehicle, and/or to reduce the noise generated by the rotors of the vehicle, noise abatement, and other advantages. Shrouds, nozzles, protective covers, turbines, etc. can dynamically reshape, redirect, or modulate the downwash. FIGS. 5A-5C illustrate examples of nozzle or shroud designs.

In FIG. 5A, the nozzle or shroud is located around and below a propeller or other rotor. The nozzle directs the air from the propeller or other rotor to provide a faster and more concentrated (or focused) outflow of the air, potentially increasing the lift. The nozzle may also result in decreased power consumption because of reduced rotations per minute (RPM) of the propeller or other rotor while maintaining the same lift that would be produced by the propeller or other rotor at higher RPM (hence increased power consumption) without the nozzle. Reducing the power consumption for the same lift can increase flight time of the rotorcraft or multicopter.

FIG. 5B shows a curved nozzle or shroud design that (re-)directs the air from the propeller or other rotor to provide a faster and more concentrated (or focused) outflow of the air. The curved nozzle is directed to enhance lateral displacement motion, but this may potentially be at the expense of the enhanced lift. The nozzle outflow port can be rotatable to point in different directions, facilitating lateral control of the rotorcraft or multicopter.

FIG. 5C illustrates a combined nozzle or shroud design that allows for synergistic merging of two or more airflow streams, generated by two or more propellers or other rotors, for enhanced lift. The increased outflow speed of the air may improve the resulting lift for the multicopter. The power consumption may also be decreased (because of reduced RPM of the propellers or other rotors) when maintaining the same lift as without a nozzle but at higher RPM of the propellers or other rotors (hence increased power consumption), which can result in increased flight time.

Figure 6:
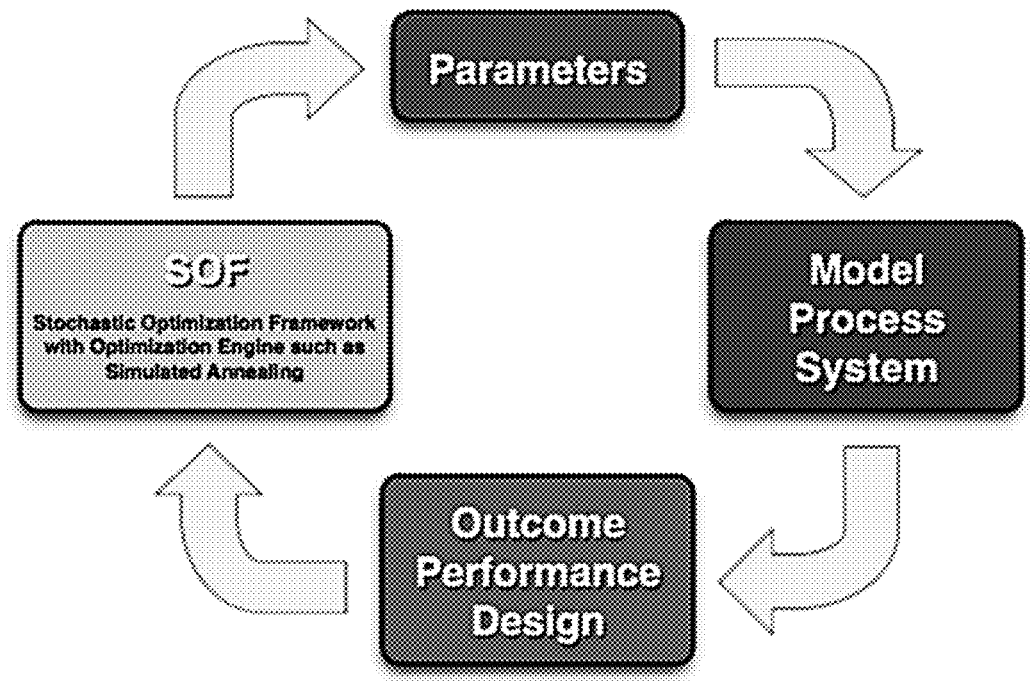
FIG. 6 illustrates a Stochastic Optimization Framework that can be used to optimize nozzle designs, in accordance with various embodiments of the present disclosure.

The design of the nozzles, shrouds, protective covers, and turbines, etc., can be optimized using, e.g., a Stochastic Optimization Framework such as that described in *Stochastic Optimization Framework for Computer-Optimized Design, Engineering, and Performance of Multi-dimensional Systems and Processes (SOF)* [Fink, SPIE 2008]. FIG. 6 shows a functional schematic of the SOF, which can efficiently sample the parameter space associated with a model, process, or system (1) by repeatedly running the model, process, or system in a forward fashion, and (2) by comparing the respective outcomes against a desired outcome, which results in a fitness measure. The goal of the SOF is to optimize this fitness by using multi-dimensional optimization algorithms, such as, but not limited to, Simulated Annealing or Genetic Algorithms or Evolutionary Algorithms, as well as Marquardt-Levenberg-type algorithms, as the optimization engine to determine optimal parameter values. One way to determine optimal parameter values is to analytically invert models, processes, or systems, or to run them backwards starting from an optimal or desired state or performance. However, this is often infeasible, prohibitive, or impossible, because of the non-linearity of models, processes, or systems. The SOF overcomes the complexity and high degree of nonlinearity of this design problem by effectively "inverting" these models, processes, or systems to determine, in a forward fashion, parameter values that, when applied, yield the desired outcomes, or approximate them as closely as possible.

Figure 7A:
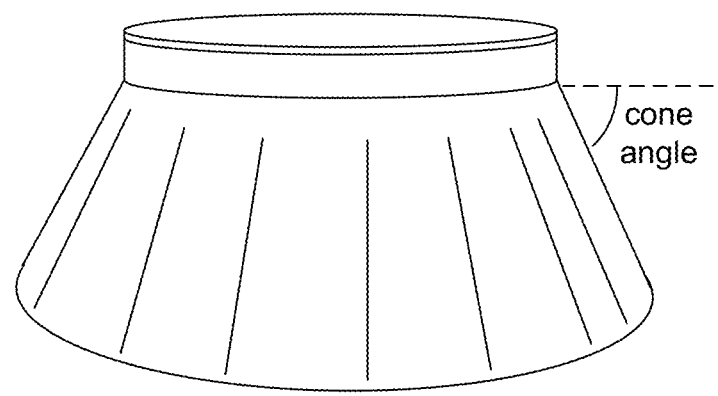
FIGS. 7A-7D illustrate examples of nozzles that can be mounted on a rotorcraft or multicopter, in accordance with various embodiments of the present disclosure.
Figure 7B:
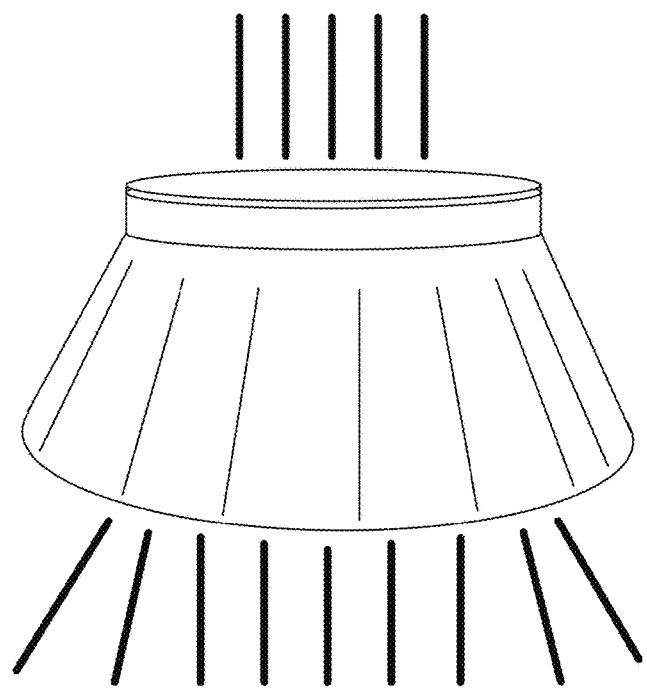

Using the SOF, a shroud or nozzle can be designed that when placed underneath, above, and/or around the rotor (or propeller) of a rotorcraft or multicopter would modulate, reshape, or redirect its downwash, e.g., to regulate the downwash velocity. In the example of regulating the downwash velocity, the downwash velocity is the fitness to be optimized by the SOF towards a desired downwash velocity, and can be measured or assessed, for example, with an anemometer during the SOF-based optimization process (FIG. 3). To optimize the fitness, the SOF would alter conformational parameters that describe the design or configuration of a shroud, nozzle, protective cover, and/or turbine. Example conformational parameters of shroud, nozzle, protective cover, and turbine design to be optimized via SOF include, but are not limited to, opening diameters (e.g., opening diameters of an iris or aperture at the intake and/or exit opening of the nozzle or shroud), overall length, shape, cross-sections, cone angle (see FIG. 7A), etc. In another example, the fitness to be optimized by the SOF could be energy consumption (e.g., current or electric power, etc.) to maintain a certain hover altitude by altering at least one conformational parameter. FIG. 7A illustrates an example of a nozzle or shroud that can be placed underneath, above, and/or around the rotor (or propeller) of a rotorcraft or multicopter to modulate or reshape its downwash. FIG. 7A shows also the cone angle of the nozzle or shroud. Different nozzle/shroud shapes can be optimized to achieve application specific requirements. FIG. 7B illustrates one example of how the airflow produced by the rotor or propeller of the rotorcraft or multicopter can be shaped or directed by a nozzle or shroud underneath and/or around the rotor or propeller.

Figure 7C:
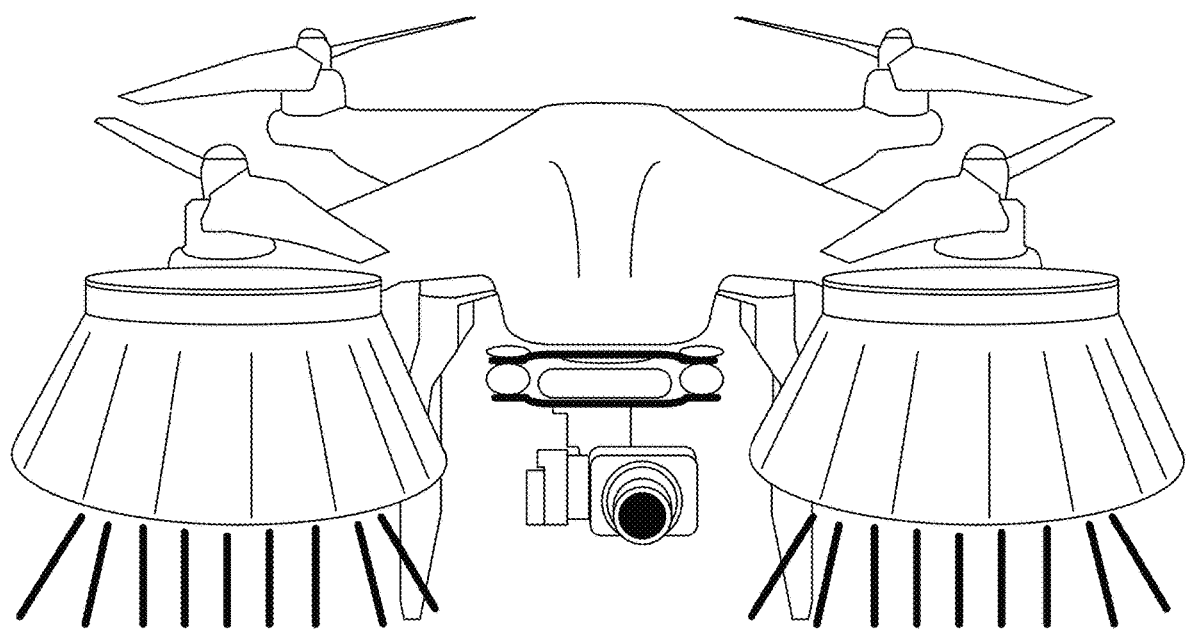
Figure 7D:
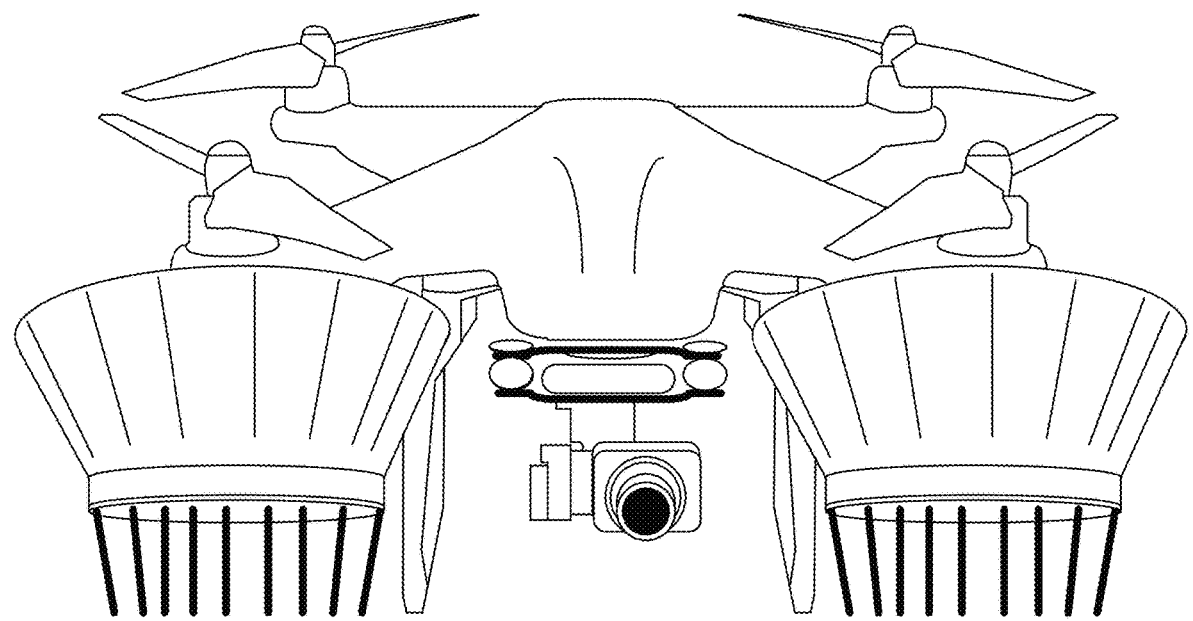

The nozzles or shrouds can be mounted to rotorcraft or multicopters as desired. FIG. 7C shows an example of a nozzle/shroud equipped quadcopter with nozzles or shrouds positioned to modulate or reshape the downwash of its four rotors. Only two nozzles are visible in this illustration. The shapes of the nozzles or shrouds can be designed to meet specific design needs. For example, FIG. 7D shows an example of a nozzle/shroud equipped quadcopter with nozzle or shroud shape inverted to reshape and concentrate the downwash of its four rotors. Only two nozzles are visible in this illustration. In addition to downwash modulation/reshaping, the nozzle or shroud can also serve as a replacement of the landing skids of the rotorcraft or multicopter, potentially resulting in a net-zero overall mass increase of the aircraft. As illustrated in FIGS. 5B and 5C, the nozzle/shrouds can be configured to redirect the downwash and airflow or combine/fuse two or more downwashes and airflows for even more concentrated downwash.

Figure 8:
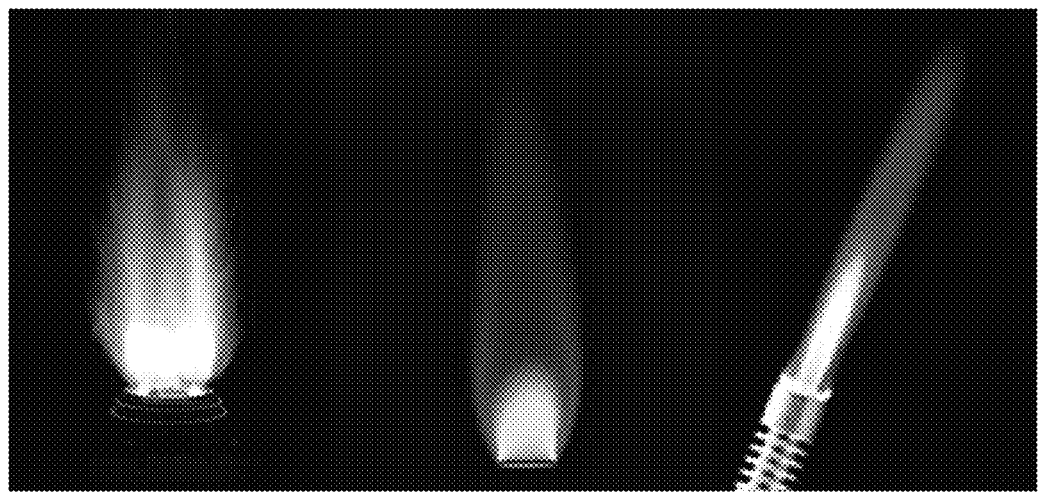
FIG. 8 illustrates soldering torch flame assemblies, in accordance with various embodiments of the present disclosure.

Active or dynamic morphing, reshaping or redirecting of the nozzle, shroud, protective cover, and/or turbine (e.g., through built-in actuators, such as bi-metals, nitinol, hydraulics, servos, etc.) in midflight/mid-air is possible, depending on operational situation(s) and/or scenario(s). In one example, among others, the SOF can be directly used to effectuate the conformational changes (e.g., via actuators) in the shroud, nozzle, protective cover, and/or turbine design to accommodate and/or respond to the operational situation(s) and scenario(s). The fitness feedback in midflight/mid-air to the SOF can be accomplished, for example, with an anemometer to measure downwash velocity, a global positioning system (GPS) onboard the rotorcraft or multicopter to measure position in 3D space, an inertial measurement unit (IMU) to measure 3D attitude in mid-air, and/or at least one accelerometer to measure acceleration in x, y, or z direction. Moreover, the SOF can be used to actively reorient the nozzle or shroud, to spatially redirect the rotor downwash in addition to morphing and reshaping it. Also, the intensity of the rotor downwash can be modulated/regulated, e.g., by widening, narrowing, or changing the cone angle of the intake and/or exit opening of the nozzle or shroud, similar to the intensity/temperature regulation of a soldering torch flame as illustrated in FIG. 8 or the jet/afterburner assembly of a fighter jet. In another example, the intensity of the rotor downwash can be modulated/regulated by changing the diameter of an adjustable iris or aperture at the intake and/or exit opening of the nozzle or shroud. In another example, the SOF can be used to pre-train or implement a motif-based auto-controller to accommodate and/or respond to, for example, a set of operational situation(s) and scenario(s), and/or to actively reorient the nozzle or shroud, to spatially redirect the rotor downwash in addition to morphing and reshaping it, and/or to modulate/regulate the intensity of the rotor downwash. Here, each operational situation(s) and/or scenario(s), and/or active reorientation(s) of the nozzle or shroud, and/or spatial redirection(s) of the rotor downwash, and/or modulation(s)/regulation(s) of the intensity of the rotor downwash would be addressed by at least one identified control-motif, e.g., a pre-determined set and/or sequence of conformational changes (e.g., via actuators) in the shroud, nozzle, protective cover, and/or turbine design, such as, but not limited to, opening diameters (e.g., controlled by an iris or aperture at the intake and/or exit opening of the nozzle or shroud), overall length, shape, cross-sections, cone angle (see FIG. 7A), etc. Each control-motif would be pre-trained or implemented using the SOF. In one example, among others, such a SOF-optimized auto-controller could be a proportional-integral-derivative controller (PID controller) such as that described in *Optimal Attitude Control Parameters via Stochastic Optimization Framework for Autonomous Aircraft* [Bassi & Fink, IEEE Aerospace Conference Proceedings, 2009].

Figure 9:
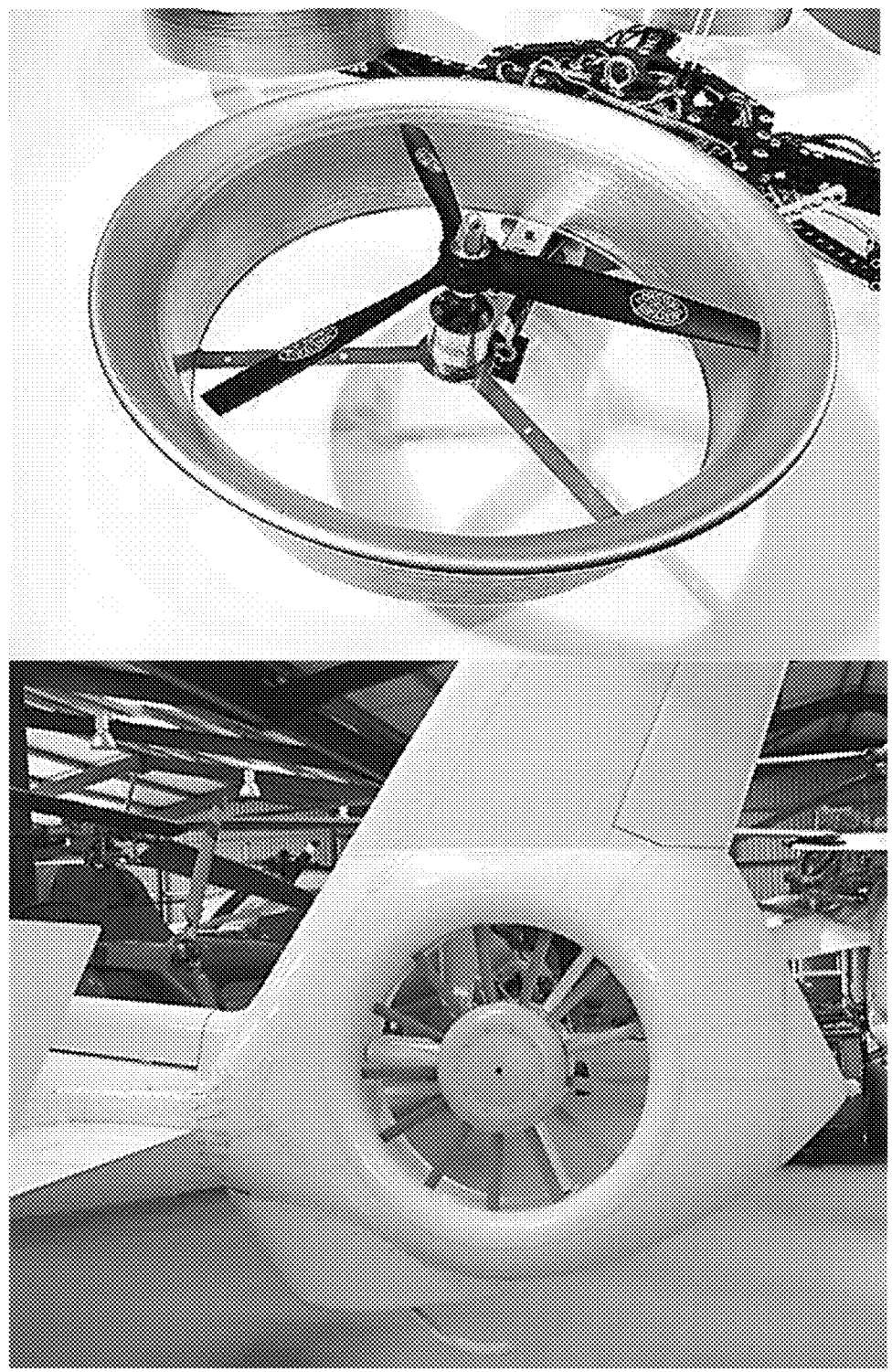
FIG. 9 illustrates examples of protective and/or noise-reducing covers or shrouds, in accordance with various embodiments of the present disclosure.

Configuration of the nozzle or shroud can provide protection to the ground personnel when accessing or working near a rotorcraft or multicopter and can protect the rotorcraft or multicopter from ambient dust and/or sand stirred up by near ground operation, as well as from obstacles during flight (e.g., contact with walls, houses, trees, landscape, mountains, etc.). FIG. 9 shows examples of protective and/or noise-reducing shrouds or covers that can provide noise abatement and/or protection to personnel and the rotorcraft or multicopter (and its rotors).

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that do not negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A rotorcraft or multicopter, comprising:
   one or more rotors, each rotor configured to rotate about a different axis; and
   one or more nozzles positioned in relationship to at least one corresponding rotor of the one or more rotors, the one or more nozzles comprising a downwash path having a shape configured to modulate, reshape or redirect downwash produced by the at least one corresponding rotor, where the shape of the downwash path of the one or more nozzles is configured to concentrate the downwash produced by the at least one corresponding rotor.

2. The rotorcraft or multicopter of claim 1, wherein the one or more nozzles direct the concentrated downwash below the rotorcraft or multicopter to enhance lift.

3. The rotorcraft or multicopter of claim 1, wherein the one or more nozzles are curved to redirect the concentrated downwash.

4. The rotorcraft or multicopter of claim 3, wherein the one or more nozzles redirect the concentrated downwash to enhance lateral motion of the rotorcraft or multicopter.

5. The rotorcraft or multicopter of claim 1, wherein the shape of the downwash path of the one or more nozzles adjusts concentration of the downwash thereby adjusting lift.

6. The rotorcraft or multicopter of claim 1, wherein the one or more rotors comprises a plurality of rotors, and wherein the one or more nozzles includes a combined nozzle comprising a combined downwash path having a shape configured to modulate or reshape downwash produced by at least two rotors of the plurality of rotors.

7. The rotorcraft or multicopter of claim 6, wherein the shape of the combined downwash path of the combined nozzle is configured to concentrate the downwash from the at least two rotors.

8. The rotorcraft or multicopter of claim 1, wherein the shape of the downwash path of the one or more nozzles is configured to dynamically modulate, reshape or redirect the downwash below the rotorcraft or multicopter.

9. The rotorcraft or multicopter of claim 8, wherein the shape of the downwash path of the one or more nozzles adjusts concentration of the downwash thereby adjusting lift.

10. The rotorcraft or multicopter of claim 8, wherein the shape of the downwash path of the one or more nozzles is morphed or reshaped to dynamically modulate or reshape the downwash.

11. The rotorcraft or multicopter of claim 10, wherein the shape of the downwash path of the one or more nozzles is morphed or reshaped by effectuating a conformational change in the downwash path of the one or more nozzles.

12. The rotorcraft or multicopper of claim 11, wherein the conformational change is effectuated by at least one of a stochastic optimization framework or a motif-based autocontroller.

13. The rotorcraft or multicopter of claim 1, wherein the one or more nozzles redirects the downwash thereby compensating for lateral movement.

14. The rotorcraft or multicopter of claim 1, wherein the shape of the downwash path of the one or more nozzles adjusts the downwash when approaching a surface thereby compensating for ground effects.

15. The rotorcraft or multicopter of claim 1, wherein the one or more nozzles are configured as landing skids thereby providing support of the rotorcraft or multicopter.

16. The rotorcraft or multicopter of claim 1, wherein the one or more nozzles are configured as protective covers thereby providing protection to ground personnel when accessing or working near a rotorcraft or multicopter.

17. The rotorcraft or multicopter of claim 1, wherein the one or more nozzles are configured as protective covers thereby reducing noise generated by one or more rotors of the rotorcraft or multicopter.

18. The rotorcraft or multicopter of claim 1, wherein the one or more nozzles are configured as protective covers thereby protecting the rotorcraft or multicopter from ambient dust and/or sand stirred up by near ground operation or obstacles during flight.

* * * * *